US012182045B2

(12) United States Patent
Terashima et al.

(10) Patent No.: US 12,182,045 B2
(45) Date of Patent: Dec. 31, 2024

(54) SEMICONDUCTOR DEVICE

(71) Applicant: RENESAS ELECTRONICS CORPORATION, Tokyo (JP)

(72) Inventors: Kazuaki Terashima, Tokyo (JP); Atsushi Nakamura, Tokyo (JP); Rajesh Ghimire, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 18/152,582

(22) Filed: Jan. 10, 2023

(65) Prior Publication Data

US 2023/0297528 A1    Sep. 21, 2023

(30) Foreign Application Priority Data

Mar. 18, 2022  (JP) ................. 2022-043264

(51) Int. Cl.
*G06F 13/28* (2006.01)
*G06F 7/544* (2006.01)
*G06F 13/16* (2006.01)

(52) U.S. Cl.
CPC ............ *G06F 13/28* (2013.01); *G06F 7/5443* (2013.01); *G06F 13/1689* (2013.01)

(58) Field of Classification Search
CPC ..... G06F 13/28; G06F 7/5443; G06F 13/1689
See application file for complete search history.

(56) References Cited

U.S. PATENT DOCUMENTS

| 11,222,688 | B2 | 1/2022 | Yoshida et al. | |
| 2019/0266218 | A1* | 8/2019 | Scott | ............... G06F 13/28 |
| 2022/0100601 | A1* | 3/2022 | Baum | ............. G06F 11/1608 |
| 2023/0297432 | A1* | 9/2023 | Whatmough | ......... G06F 1/3234 |
| | | | | 718/104 |

FOREIGN PATENT DOCUMENTS

JP    2021-064193 A    4/2021

* cited by examiner

*Primary Examiner* — Zachary K Huson
(74) *Attorney, Agent, or Firm* — Rimon P.C.

(57) ABSTRACT

A semiconductor device capable of preventing a sharp variation in current consumption in neural network processing is provided. A dummy circuit outputs dummy data to at least one or more of n number of MAC circuits and causes the at least one or more of n number of MAC circuits to perform a dummy calculation and to output dummy output data. An output-side DMA controller transfers pieces of normal output data from the n number of MAC circuits to a memory, by use of n number of channels, respectively, and does not transfer the dummy output data to the memory. In this semiconductor device, the at least one or more of n number of MAC circuits perform the dummy calculation in a period from a timing at which the output-side DMA controller ends data transfer to the memory to a timing at which the input-side DMA controller starts data transfer from the memory.

12 Claims, 12 Drawing Sheets

SEMICONDUCTOR DEVICE

CROSS-REFERENCE TO RELATED APPLICATIONS

The disclosure of Japanese Patent Application No. 2022-043264 filed on Mar. 18, 2022 including the specification, drawings and abstract is incorporated herein by reference in its entirety.

BACKGROUND

This invention relates to a semiconductor device and for example, relates to a semiconductor device that executes neural network processing.

There are disclosed techniques listed below.

[Patent Document 1] Japanese Unexamined Patent Application Publication No. 2021-64193

Patent Document 1 discloses such a technique that makes it possible to reduce an operation current flowing on a signal bus and takes input of a large amount of data accurately, at a time of data transfer, in a semiconductor device including a logic device and a memory device. The semiconductor device described above uses a data signal having an amplitude which is lower than an amplitude of a power supply voltage, a first clock signal, and a second clock signal, a phase of which shifts by a predetermined amount from the first clock signal. Each of the logic device and the memory device takes input of data in synchronization with rise edges of the first and the second clock signals.

SUMMARY

For example, in neural network processing such as CNN (Convolutional Neural Network), a plurality of DMA (Direct Memory Access) controllers, a plurality of multiplier accumulators (referred to as MAC (Multiply ACcumulate) circuits), and the like which are mounted on a semiconductor device are used to perform a huge amount of calculation processing. More specifically, the plurality of DMA controllers transfer image data or coefficient data in a certain layer stored in a memory to the plurality of MAC circuits, thereby causing the plurality of MAC circuits to perform multiply-accumulate calculations. In addition, the plurality of DMA controllers transfer the result of multiply-accumulate calculations by the plurality of MAC circuits to the memory, as image data in the next layer. The semiconductor device executes such processing repeatedly.

Meanwhile, in the semiconductor device, miniaturization of a manufacturing process and maturation of a circuit have been advanced. As a result, a processing efficiency of a neural network is increased, and the number of calculations to be executable in units of time is increased. Along with this technological development, a current consumption tends to be increased. Here, in a case in which a period in which a calculation is performed is represented as an active period and a waiting period required for transiting to the active period is represented as an idle period, in general, in the plurality of MAC circuits, the idle period and the active period are switched at the same time. As a consequence, a time required for neural network processing can be shortened to the maximum.

However, in a case in which such a simultaneous switching is carried out, a sharp change in current consumption is generated, and a variation of the power supply voltage may be caused due to parasitic inductance components and other components of wires in the power supply. The variation of the power supply voltage may become larger, as the current consumption increases, and furthermore, as a change rate of the current consumption becomes larger. In order to prevent the variation of the power supply voltage, for example, a design of the power supply of the semiconductor device needs more strength. Note that, however, a level of difficulty in designing is increased, and design costs and manufacturing costs may be increased.

The embodiments to be described later are achieved in view of these matters, and other objects and novel characteristics will be apparent from the description of the present specification and the accompanying drawings.

A semiconductor device according to one embodiment executes neural network processing and includes n (n is two or more integer) number of multiplier accumulators, one or a plurality of memories, a first DMA (Direct Memory Access) controller, a second input-side DMA controller, a dummy circuit, and a second output-side DMA controller. The n (n is two or more integer) number of multiplier accumulators multiply and accumulate pieces of input data and parameters. The one or a plurality of memories store the pieces of input data and the parameters. The first DMA (Direct Memory Access) controller transfers the parameters stored in the memory to the n number of multiplier accumulators. The second input-side DMA controller transfers the pieces of input data stored in the memory to the n number of multiplier accumulators, by use of n number of channels, respectively, and causes the n number of multiplier accumulators to perform calculations and to thereby output corresponding pieces of normal output data serving as the calculation results. The dummy circuit outputs dummy data determined in advance to at least one or more of the n number of multiplier accumulators, thereby causing the at least one or more of the n number of multiplier accumulators to perform a dummy calculation and to output dummy output data serving as the dummy calculation result. The second output-side DMA controller transfers the respective pieces of normal output data from the n number of multiplier accumulators to the memory, by use of n number of channels, and does not transfer the dummy output data from the at least one or more of the n number of multiplier accumulators to the memory. Here, the at least one or more of the n number of multiplier accumulators perform the dummy calculation in a period from a timing at which the second output-side DMA controller ends data transfer to the memory to a timing at which the second input-side DMA controller starts data transfer from the memory.

With use of the semiconductor device according to one embodiment of the present disclosure, it is possible to prevent a sharp variation in current consumption.

DETAILED DESCRIPTION

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specific number is also applicable. Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and the repetitive description thereof is omitted. In addition, the description of the same or similar portions is not repeated in principle unless particularly required in the following embodiments.

First Embodiment

Schematic Configuration of Semiconductor Device

Figure 1:
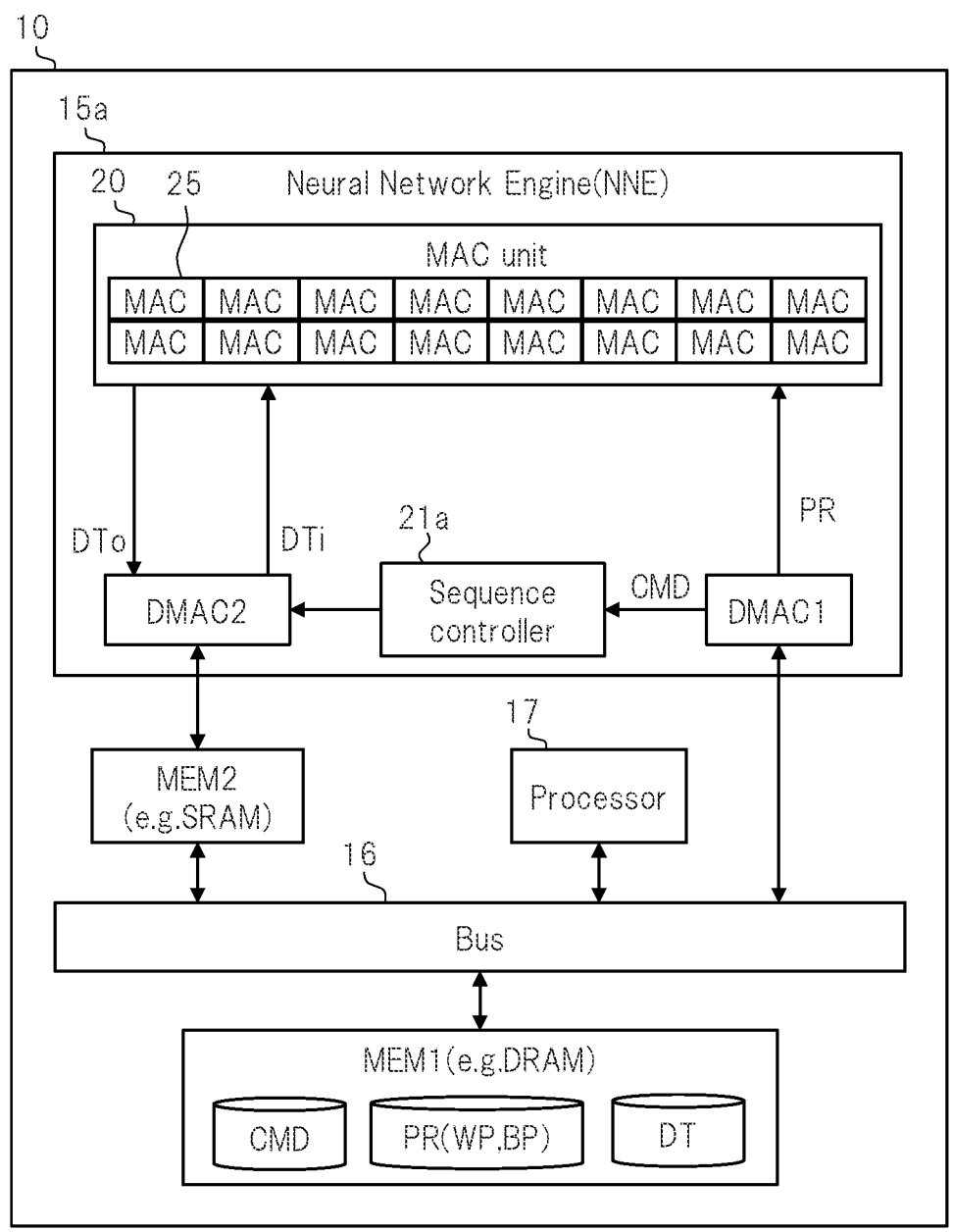
FIG. 1 is a schematic diagram showing a configuration example of principle sections in a semiconductor device according to a first embodiment of the present disclosure.

FIG. 1 is a schematic diagram showing a configuration example of principle sections in a semiconductor device according to a first embodiment of the present disclosure. A semiconductor device 10 shown in FIG. 1 is an SoC (System on Chip) or the like including one semiconductor chip, for example. The semiconductor device 10 is, in typical, mounted on an ECU (Electronic Control Unit) in a vehicle, or the like, providing a function of an ADAS (Advanced Driver Assistance System).

The semiconductor device 10 shown in FIG. 1 includes a neural network engine (NNE) 15a, a processor 17 such as a CPU (Central Processing Unit), one or a plurality of memories MEM1 and MEM2, and a system bus 16. The system bus 16 connects the neural network engine 15a, the memories MEM1 and MEM2, and the processor 17 with each other. The neural network engine 15a executes neural network processing typified as a convolutional neural network (CNN). The processor 17 executes a predetermined program that is stored in the memory MEM1, thereby causing the semiconductor device 10 to carry out a predetermined function, in addition to control of the neural network engine 15a.

The memory MEM1 is a DRAM (Dynamic Random Access Memory) or the like, and the memory MEM2 is an SRAM (Static Random Access Memory) for cache, or the like. The memory MEM1 stores data DT including pixel values, parameters PR, and commands CMD, for example. The parameter PR includes a weight parameter WP and a bias parameter BP. The command CMD is used for controlling an operation sequence of the neural network engine 15a. The memory MEM2 is used as a high-speed cache memory of the neural network engine 15a. For example, a plurality of pieces of of data DT in the memory MEM1 are copied in the memory MEM2 in advance and then used in the neural network engine 15a.

The neural network engine 15a includes a plurality of DMA (Direct Memory Access) controllers DMAC1 and DMAC2, an MAC unit 20, and a sequence controller 21a. The MAC unit 20 includes a plurality of MAC circuits 25, that is, a plurality of multiplier accumulators. The DMA controller DMAC1 controls data transfer through the system bus 16 between the memory MEM1 and the plurality of MAC circuits 25 in the MAC unit 20, for example. The DMA controller DMAC2 controls data transfer between the memory MEM2 and the plurality of MAC circuits 25 in the MAC unit 20.

More specifically, the DMA controller DMAC1 transfers the parameters PR stored in the memory MEM1 to the plurality of MAC circuits 25 in the MAC unit 20. Also, the DMA controller DMAC1 transfers the commands CMD stored in the memory MEM1 to the sequence controller 21a.

In contrast, the DMA controller DMAC2 transfers data stored in the memory MEM2 as input data DTi to each of the plurality of MAC circuits 25 in the MAC unit 20, to thereby cause the plurality of MAC circuits 25 to perform calculations. More specifically, each of the plurality of MAC circuits 25 performs a multiply-accumulate calculation on the input data DTi from the DMA controller DMAC2 and the weight parameter WP from the DMA controller DMAC1, and adds thereto the bias parameter BP from the DMA controller DMAC1, for example.

As a result, each of the plurality of MAC circuits 25 outputs output data DTo serving as the calculation result. The output data DTo represents, for example, pixel values of a feature map obtained from each layer of the neural network. The DMA controller DMAC2 transfers the output data DTo to the memory MEM2. The output data DTo transferred to the memory MEM2 is used as input data DTi to be used for the next layer of the neural network. In other words, for example, the input data DTi for the first layer of the neural network is determined by the data DT stored in the memory MEM1, and the input data DTi for the second and subsequent layers is determined by the output data DTo from each of the plurality of MAC circuits 25.

The sequence controller 21a controls operation sequence or the like of the neural network engine 15a, according to the command CMD from the DMA controller DMAC1. By way of example, the sequence controller 21a outputs, to the DMA controller DMAC2, a read start signal for starting data transfer from the memory MEM2. In addition, the sequence controller 21a makes a transfer setting with respect to the DMA controller DMAC2, for example, a setting of an address range of the memory MEM2 in which the input data DTi is stored and a setting of an address range of the memory MEM2 in which the output data DTo is stored.

Configuration of Neural Network Engine

Figure 2:
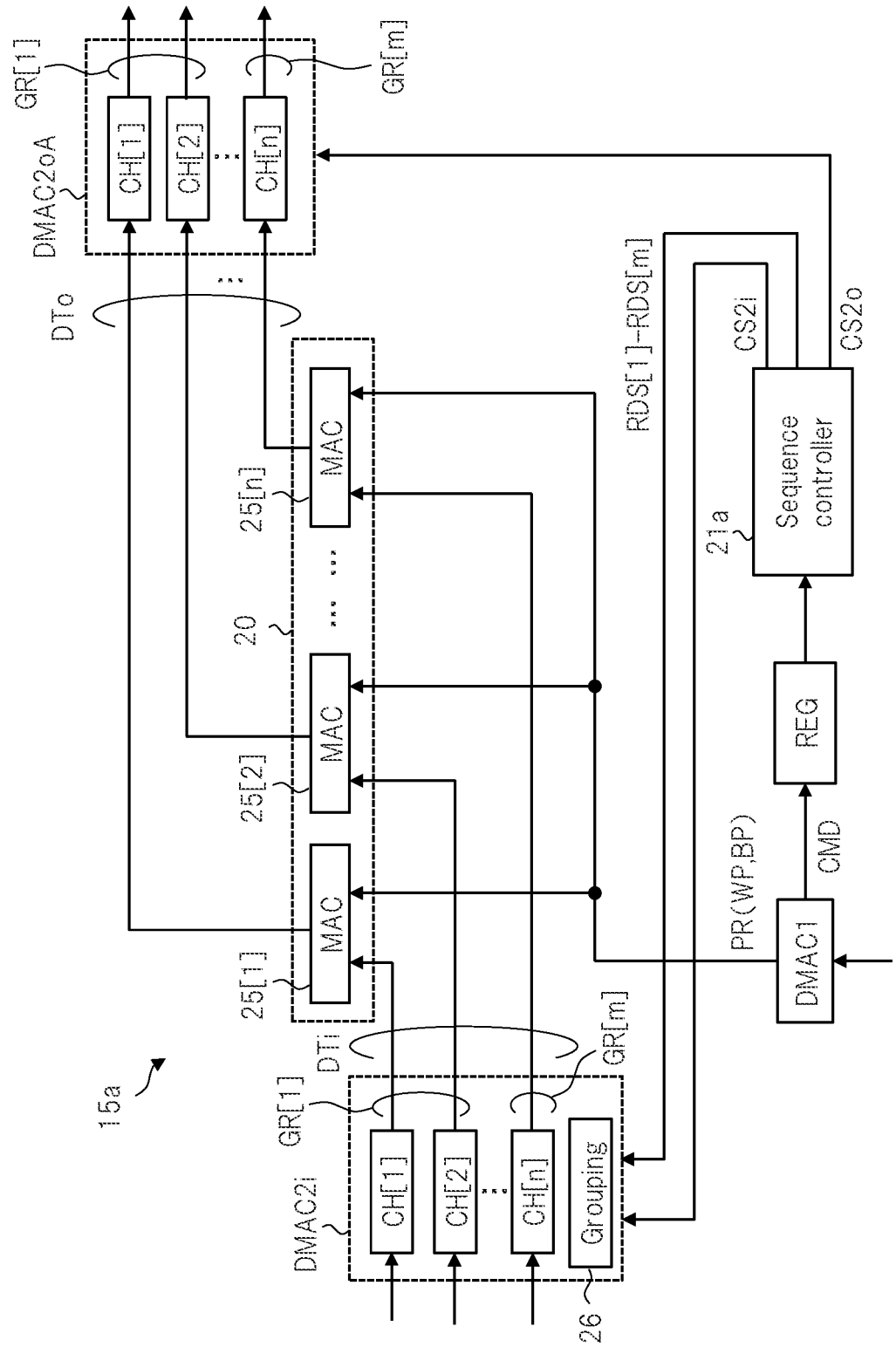
FIG. 2 is a diagram showing a detailed configuration example of a neural network engine of FIG. 1.

FIG. 2 is a diagram showing a detailed configuration example of the neural network engine of FIG. 1. In FIG. 2, the MAC unit 20 has n (n is an integer of 2 or more) number of MAC circuits 25[1] to 25[n]. A value of n is 16, for example. The DMA controller DMAC1 reads information from the memory MEM1, on the basis of the address range set in advance, for each control cycle. The read information suitably includes the parameters PR and the command CMD. The DMA controller DMAC1 transfers the read parameters PR to the n number of MAC circuits 25[1] to 25[n], and retains the read command CMD in a register REG.

More specifically, the DMA controller DMAC2 shown in FIG. 1 includes an input-side DMA controller DMAC2i and an output-side DMA controller DMAC2oA, as shown in FIG. 2. Each of the input-side DMA controller DMAC2i and the output-side DMA controller DMAC2oA has n number of channels CH[1] to CH[n].

The input-side DMA controller DMAC2i transfers the input data DTi stored in the memory MEM2 to each of the n number of MAC circuits 25[1] to 25[n] with use of each of the n number of channels CH[1] to CH[n], causing the n number of MAC circuits 25[1] to 25[n] to perform calculations. Each of the n number of channels CH[1] to CH[n] has an address range set thereto, the address range for use in reading the input data DTi from the memory MEM2.

More specifically, for example, the MAC circuit 25[1] performs the multiply-accumulate calculation on a plurality of pieces of input data DTi from the channel CH[1] of the input-side DMA controller DMAC2i and on a plurality of weight parameters WP from the DMA controller DMAC1. Also, the MAC circuit 25[1] adds the bias parameter BP from the DMA controller DMAC1 to the result of the multiply-accumulate calculation, and outputs the output data DTo as the calculation result.

As a more specific configuration example, the channel CH[1] of the input-side DMA controller DMAC2i reads, with the number of input channels of the neural network as "M" and a kernel size as "K," "M×K" number of input data DTi, for example, to transfer the read "M×K" number of input data DTi to the MAC circuit 25[1]. Meanwhile, the DMA controller DMAC1 also reads "M×K" number of weight parameters WP to transfer the read weight parameters WP to the MAC circuit 25[1].

The MAC circuit 25[1] includes, for example, "M×K" number of multipliers and an accumulator that adds multiplication results of these multipliers. Accordingly, the MAC circuit 25[1] performs "M×K" number of multiply-accumulate calculations, and separately adds the bias parameter BP to the multiply-accumulate calculation results, to output the output data DTo representing a value of one coordinate in the feature map. As in the case of the MAC circuit 25[1], the same holds for the other MAC circuits 25[2] to 25[n].

At this time, the other MAC circuits 25[2] to 25[n] may perform calculations on pieces of input data DTi which are different from one another, that is, on pieces of input data DTi which are different in a coordinate range from one another, in association with convolution calculation. Alternatively, the other MAC circuits 25[2] to 25[n] may perform calculations on the same input data DTi. In the former case, the n number of MAC circuits 25[1] to 25[n] use the common parameter PR. In contrast, in the latter case, the n number of MAC circuits 25[1] to 25[n] use the parameters PR which are different from one another. In other words, in the latter case, each of the n number of MAC circuits 25[1] to 25[n] is allocated to a different output channel in the neural network.

The output-side DMA controller DMAC2oA transfers respective pieces of output data DTo from the n number of MAC circuits 25[1] to 25[n], with use of the n number of corresponding channels CH[1] to CH[n], to the memory MEM2. To each of the n number of channels CH[1] to CH[n], an address range for use in writing the output data DTo into the memory MEM2 is set.

The sequence controller 21a controls, according to the command CMD retained in the register REG, operation sequences and the like of the input-side DMA controller DMAC2i and the output-side DMA controller DMAC2oA. In more detail, the sequence controller 21a makes a transfer setting in the input-side DMA controller DMAC2i with use of a control signal CS2i, for example, a setting of an address range to be read from the memory MEM2. Similarly, the sequence controller 21a makes a transfer setting in the output-side DMA controller DMAC2oA with use of a control signal CS2o, for example, a setting of an address range to be written into the memory MEM2.

Moreover, the sequence controller 21a can divide, with use of the control signals CS2i and CS2o, the n number of channels CH[1] to CH[n] in each of the input-side DMA controller DMAC2i and the output-side DMA controller DMAC2oA into m (m is an integer smaller than n) number of groups GR[1] to GR[m]. As a result, dividing the n number of channels CH[1] to CH[n] into the m number of groups GR[1] to GR[m] can lead to division of the n number of MAC circuits 25[1] to 25[n] into the m number of groups GR[1] to GR[m]. For example, in a case in which a value of n is set to 16 and a value of m is set to 4, each of four groups GR[1] to GR[4] includes four channels and four MAC circuits.

The sequence controller 21a can output read start signals RDS[1] to RDS[m] for the m number of corresponding groups GR[1] to GR[m] to the input-side DMA controller DMAC2i, at different timings from one another. The read start signals RDS[1] to RDS[m] are each a signal for starting data transfer from the memory MEM2 to each of the m number of groups GR[1] to GR[m]. Accordingly, the sequence controller 21a can control such that timings of a series of operations including a read operation by the input-side DMA controller DMAC2i, a calculation operation by the MAC unit 20, and a write operation by the output-side DMA controller DMAC2oA are different from one another among the m number of groups GR[1] to GR[m].

In order to perform grouping of the n number of channels CH[1] to CH[n] described above, the input-side DMA controller DMAC2i includes a grouping circuit 26. The grouping circuit 26 performs grouping of the n number of channels CH[1] to CH[n] into m numbers of groups, according to the control signal CS2i from the sequence controller 21a. In other words, the m number of groups GR[1] to GR[m] can be changed according to a setting made based on the control signal CS2i. The grouping circuit 26 determines a correspondence relation between the n number of channels CH[1] to CH[n] and the read start signals RDS[1] to RDS[m], according to this setting.

Operation of Neural Network Engine (Comparative Example

Figure 12:
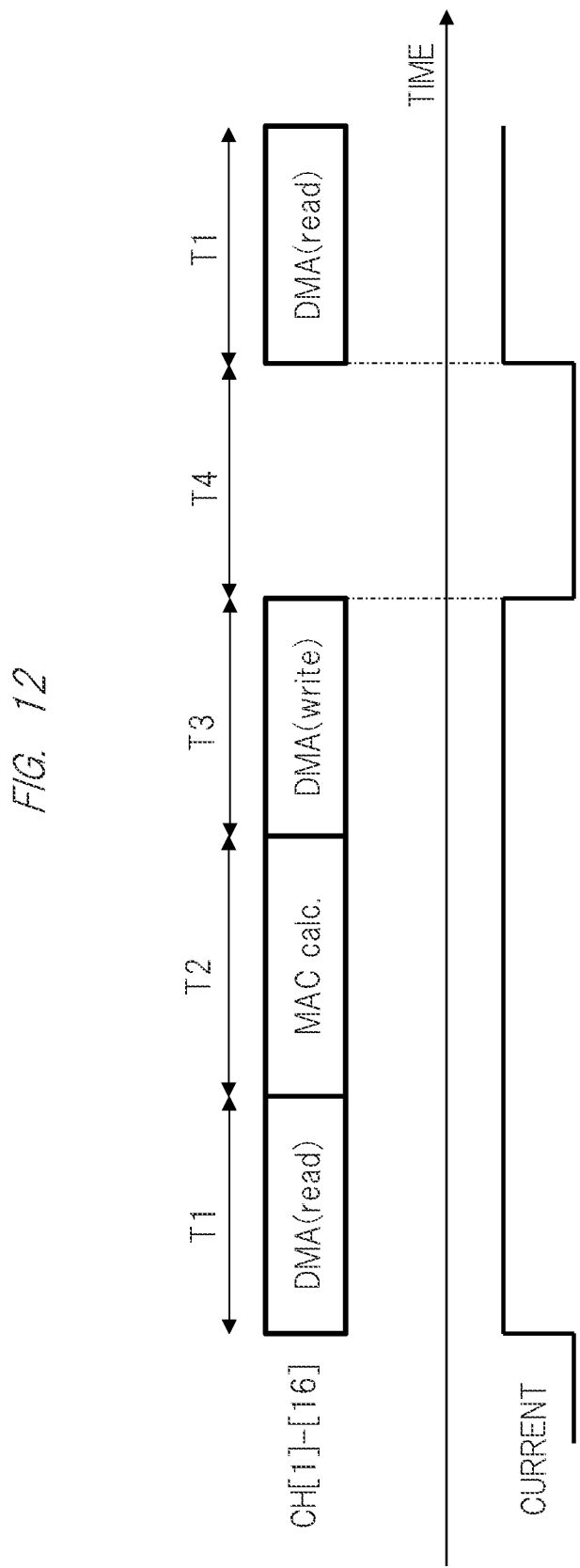
FIG. 12 is a timing chart showing an operational example of a neural network engine serving as a comparative example.

FIG. 12 is a timing chart showing an operational example of a neural network engine serving as a comparative example. The neural network engine serving as the comparative example does not have a function of grouping described in FIG. 2. In this case, as shown in FIG. 12, a series of operations including a read operation in a period T1, a calculation operation in a period T2, a write operation in a period T3 is performed such that timings of the operations are the same among the n numbers (in this example, n=16) of channels CH[1] to CH[16].

More specifically, in the period T1, the 16 channels CH[1] to CH[16] in the input-side DMA controller simultaneously transfer the respective pieces of input data DTi from the memory MEM2 to the 16 MAC circuits 25[1] to 25[16]. In the period T2, the 16 MAC circuits 25[1] to 25[16] simultaneously perform calculations. In the period T3, the 16 channels CH[1] to CH[16] in the output-side DMA controller simultaneously transfer the respective pieces of output data DTo from the 16 MAC circuits 25[1] to 25[16] to the memory MEM2. Subsequently, after a period T4 serving as the idle period, the series of operations described above is performed again in the periods T1 to T3 being the active period. In the period T4, for example, in the input and output-side DMA controllers, change of a transfer setting, that is, change of an address range of the memory MEM2, and the like are performed.

However, in a case in which such an operation is used, when the idle period and the active period are switched, that is, when the period T3 transits to the period T4, or the period T4 transits to the period T1, the current consumption sharply changes. When the current consumption sharply changes, variation in power supply voltage may occur due to a parasitic inductance component of wires of the power supply, and the like. In order to prevent the variation in power supply voltage, for example, with use of a method of providing an MIM (Metal Insulator Metal) capacitor or reinforcing bumps or the main line in the power supply as a representative, it is required to reinforce a design of the power supply of the semiconductor device. However, in this case, a level of difficulty in designing is increased, resulting in a possible increase in design costs and manufacturing costs.

Operation of Neural Network Engine (First Embodiment)

Figure 3:
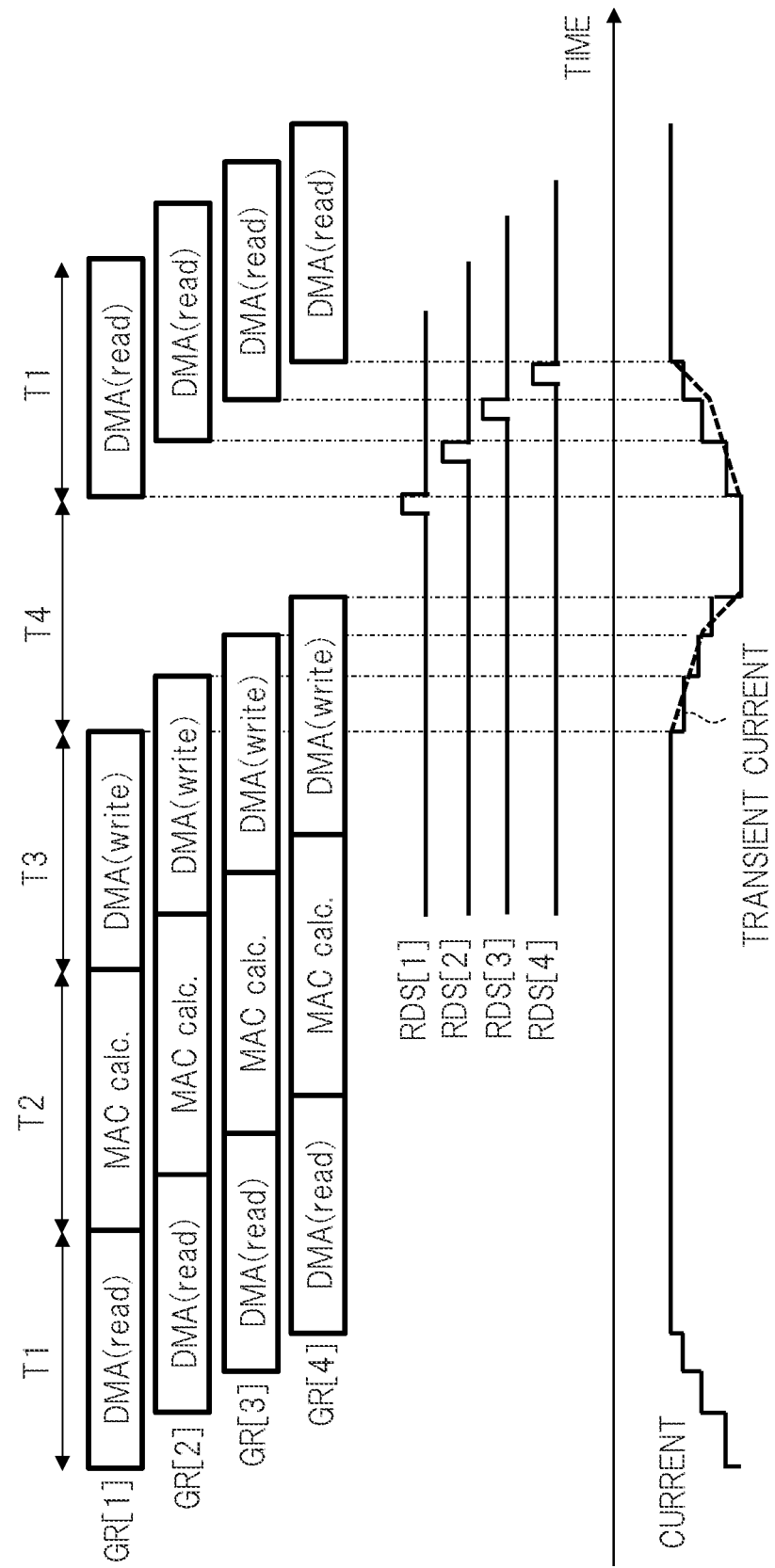
FIG. 3 is a timing chart showing an operational example of the neural network engine shown in FIG. 2.

FIG. 3 is a timing chart showing an operational example of the neural network engine shown in FIG. 2. With use of the configuration example in FIG. 2, as shown in FIG. 3, timings of the series of operations including the read operation in the period T1, the calculation operation in the period T2, the write operation in the period T3 can be controlled such that these timings are different from one another among the m number (in this example, m=4) of groups GR[1] to GR[4].

More specifically, the start timing in the period T1 in each of the groups GR[1] to GR[4] is determined according to each of the read start signals RDS[1] to RDS[4]. The sequence controller 21a outputs the read start signals RDS[1] to RDS[4] in this order, shifting each output timing by a fixed period of time. Accordingly, start timings and end timings of the series of active periods including the periods T1 to T3 are controlled so as to be different from one another among the four groups GR[1] to GR[4].

With the group GR[1] serving as an example, in the period T1, four channels CH[1] to CH[4] of the 16 channels in the input-side DMA controller DMAC2i simultaneously transfer the respective pieces of input data DTi from the memory MEM2 to four MAC circuits 25[1] to 25[4] of the 16 MAC circuits. In the period T2, the four MAC circuits 25[1] to 25[4] simultaneously perform calculations. In the period T3, four channels CH[1] to CH[4] of the 16 channels in the output-side DMA controller DMAC2oA simultaneously transfer the respective pieces of output data DTo output from the four MAC circuits 25[1] to 25[4] to the memory MEM2. Subsequently, after the period T4 serving as the idle period, in the active periods (periods T1 to T3), a series of operations is carried out again.

In this manner, the start timings and the end timings of the active periods (periods T1 to T3) are controlled so as to be different from one another among the four groups GR[1] to GR[4], so that a sharp variation in current consumption can be prevented as shown in FIG. 3. In other words, a change rate of the current consumption can be made smaller. Note that four groups are used in this case; however, the number of groups can be determined in a power-of-two unit, for example. Setting of the group is, for example, made by the command CMD before a start of a process for a predetermined layer in the neural network is carried out, and the setting is maintained while carrying out the process for the predetermined layer.

Main Effects of First Embodiment

In the foregoing description, in the scheme of the first embodiment, the n number of channels in the DMA controller and the n number of MAC circuits are divided into the m number of groups, and the m number of groups are operated at different timings from one another, so that a sharp variation in the current consumption can be prevented. As a result, the variation in power supply voltage can be prevented, and the power supply of the semiconductor device 10 can be designed more easily. Moreover, design costs and manufacturing costs can be prevented from being increased. Such effects can be more remarkably achieved, particularly, due to miniaturization or the like of the semiconductor device 10, as the number of calculations to be executable in a unit time increases.

Second Embodiment

Schematic Configuration of Semiconductor Device

Figure 4:
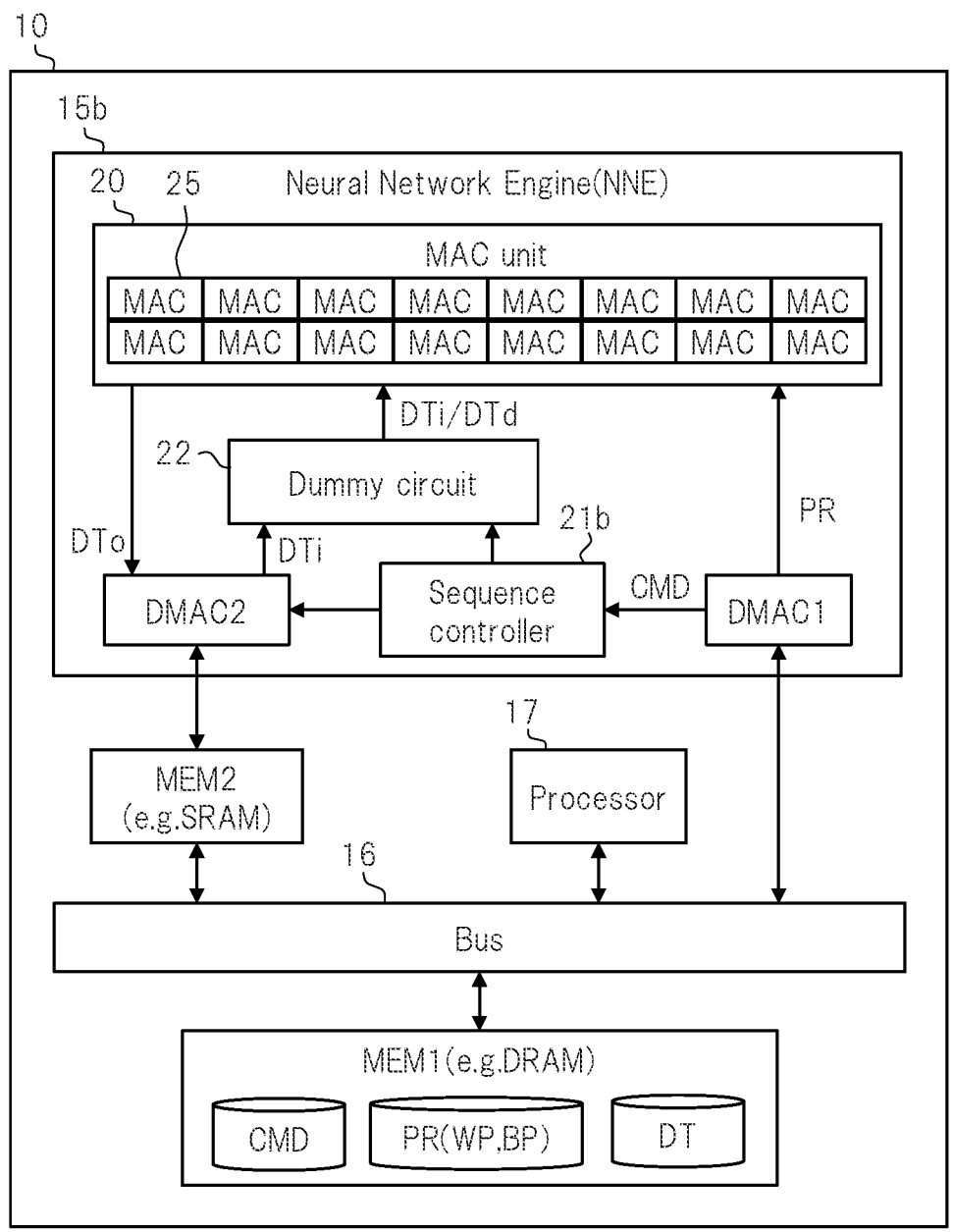
FIG. 4 is a schematic diagram showing a configuration example of principle sections in a semiconductor device according to a second embodiment of the present disclosure.

FIG. 4 is a schematic diagram showing a configuration example of principle sections in a semiconductor device according to a second embodiment of the present disclosure. A semiconductor device 10 shown in FIG. 4 is different in a configuration of a neural network engine (NNE) 15b from the configuration of the neural network engine (NNE) 15a in FIG. 1, as compared to the configuration example of FIG. 1. In the neural network engine 15b shown in FIG. 4, a dummy circuit 22 is added, as compared to the neural network engine 15a shown in FIG. 1. In association with this, a sequence controller 21b also controls the dummy circuit 22 as well as the operations similar to the case of FIG. 1.

The dummy circuit 22 outputs dummy data DTd determined in advance to at least one or more of the plurality of MAC circuits 25, and accordingly, the at least one or more of the plurality of MAC circuits 25 are caused to perform a dummy calculation, to thereby output dummy output data DToD as the calculation result. It is to be noted that, however, the DMA controller DMAC2 does not transfer the dummy output data DToD from the at least one or more of the plurality of MAC circuits 25 to the memory MEM2. In other words, the DMA controller DMAC2 transfers normal output data DTo corresponding to the input data DTi from each of the other ones of the plurality of MAC circuits 25 to the memory MEM2, but does not transfer the dummy output data DToD corresponding to the dummy data DTd to the memory MEM2.

Configuration of Neural Network Engine

Figure 5:
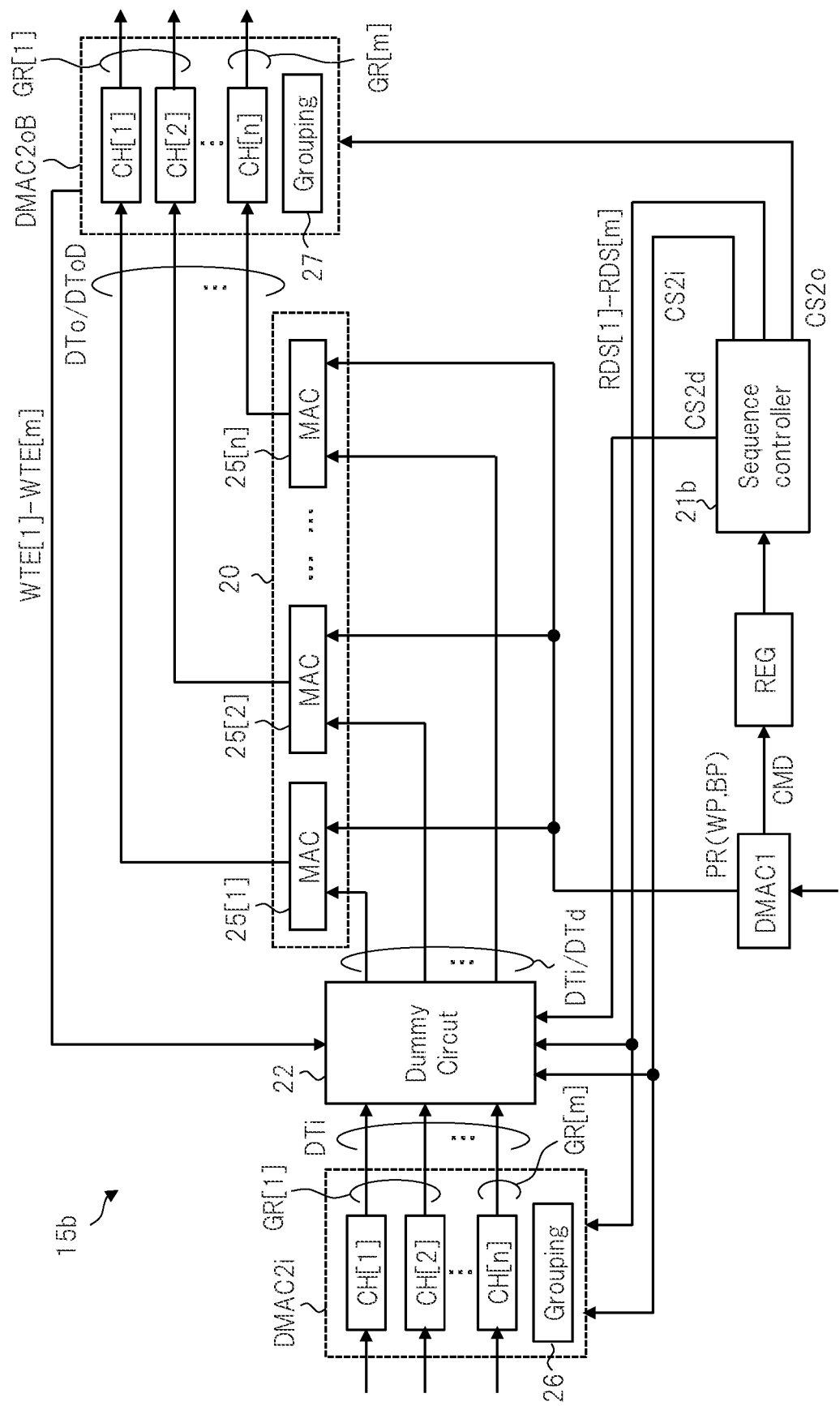
FIG. 5 is a diagram showing a detailed configuration example of a neural network engine of FIG. 4.

FIG. 5 is a diagram showing a detailed configuration example of the neural network engine of FIG. 4. Here, a description will be given, focusing on differences between the neural network engine (NNE) 15b shown in FIG. 5 and the neural network engine (NNE) 15a shown in FIG. 2, and descriptions overlapping with those of FIG. 2 will be omitted.

In FIG. 5, an output-side DMA controller DMAC2oB includes a grouping circuit 27. The grouping circuit 27 performs grouping of the n number of channels CH[1] to CH[n] into m number of groups, according to the control signal CS2o from the sequence controller 21b. In other words, the m number of groups GR[1] to GR[m] can be changed according to a setting made by the control signal CS2o.

The output-side DMA controller DMAC2oB outputs a write end signal at a time of ending data transfer to the memory MEM2. More specifically, the output-side DMA controller DMAC2oB outputs each of write end signals WTE[1] to WTE[m] for each of the m number of groups GR[1] to GR[m] at a time of ending the data transfer. The grouping circuit 27 determines a correspondence relation between the n number of channels CH[1] to CH[n] and the write end signals WTE[1] to WTE[m], according to the setting made by the control signal CS2o.

The dummy circuit 22 outputs the dummy data DTd to at least one or more of the n number of MAC circuits 25[1] to 25[n], in response to the write end signals WTE[1] to WTE[m] from the output-side DMA controller DMAC2oB. In addition, the dummy circuit 22 stops the output of the dummy data DTd in response to the read start signals RDS[1] to RDS[m] from the sequence controller 21b and outputs respective pieces of input data DTi from the input-side DMA controller DMAC2i to the n number of MAC circuits 25[1] to 25[n].

As a result, the at least one or more of the n number of MAC circuits 25[1] to 25[n] perform the dummy calculation in a period from a timing at which the output-side DMA controller DMAC2oB ends data transfer to the memory MEM2 to a timing at which the input-side DMA controller DMAC2i starts data transfer from the memory MEM2. It is to be noted that, however, as described with reference to FIG. 4, the output-side DMA controller DMAC2oB does not transfer the dummy output data DToD obtained as the result of the dummy calculation to the memory MEM2.

Incidentally, although a detailed description will be given later, the dummy circuit 22 performs grouping similar to that in the case of the input-side DMA controller DMAC2i, according to the control signal CS2i from the sequence controller 21b. In addition, the dummy circuit 22 can determine the number of MAC circuits 25 that perform the dummy calculation, for example, according to the control signal CS2d from the sequence controller 21b.

Figure 6:
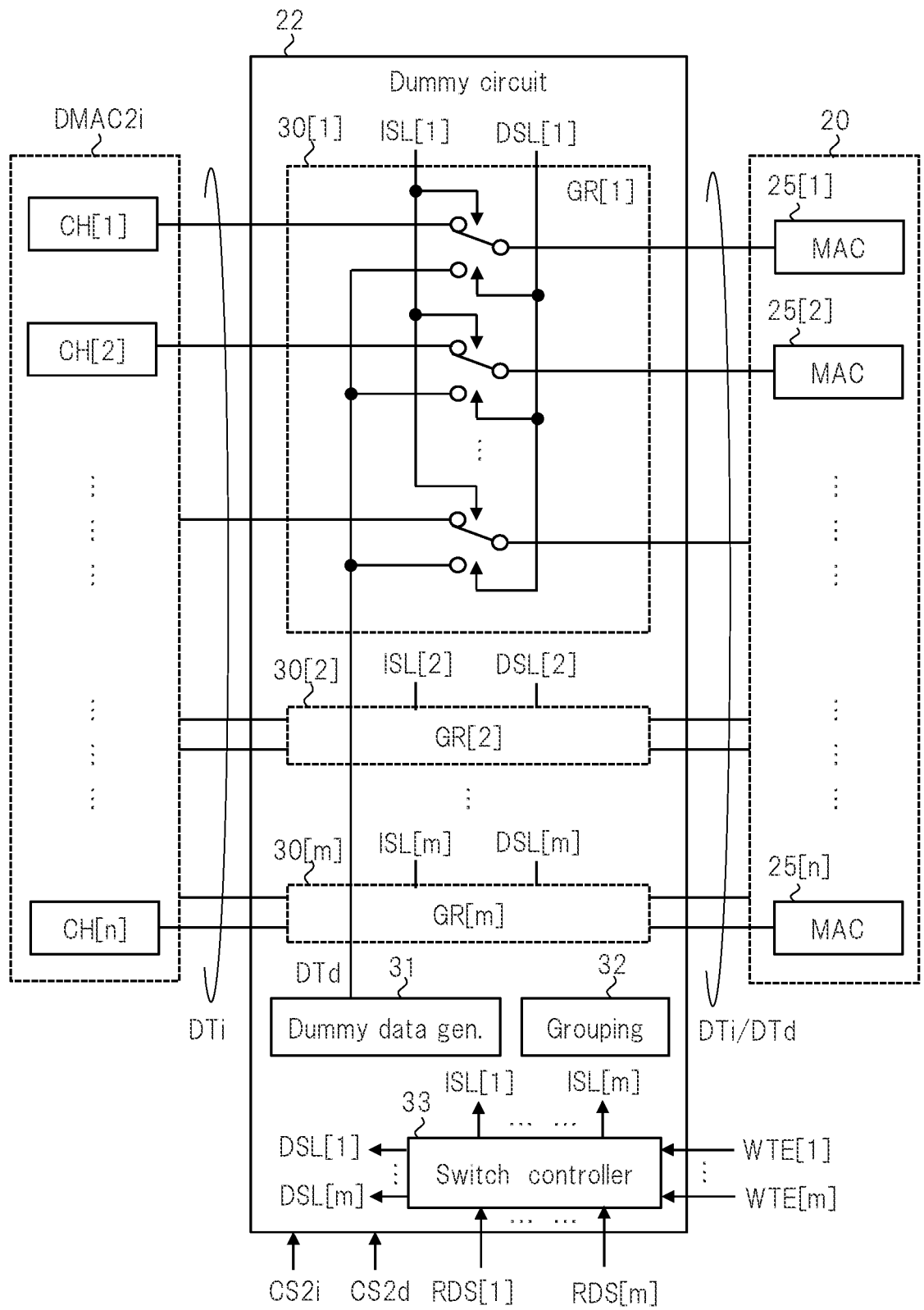
FIG. 6 is a diagram showing a schematic configuration example of a dummy circuit in FIG. 5.

FIG. 6 is a diagram showing a schematic configuration example of the dummy circuit in FIG. 5. The dummy circuit 22 shown in FIG. 6 includes m number of partial circuits 30[1] to 30[m] corresponding to the m number of groups GR[1] to GR[m], a dummy data generation circuit 31, a grouping circuit 32, and a switch controller 33. The dummy data generation circuit 31 generates dummy data DTd. The switch controller 33 includes, for example, an RS flip-flop and the like, and inputs read start signals RDS[1] to RDS[m] and write end signals WTE[1] to WTE[m] and outputs normal data selection signals ISL[1] to ISL[m] and dummy data selection signals DSL[1] to DSL[m].

For example, the normal data selection signal ISL[1] is a signal that is set in response to a fall of the read start signal RDS[1] and that is reset in response to a rise of the write end signal WTE[1]. The dummy data selection signal DSL[1] is a signal that is set in response to a fall of the write end signal WTE[1] and that is reset in response to a rise of the read start signal RDS[1]. Similarly, the normal data selection signal ISL[m] is a signal that is set in response to a fall of the read start signal RDS[m] and that is reset in response to a rise of the write end signal WTE[m]. The dummy data selection signal DSL[m] is a signal that is set in response to a fall of the write end signal WTE[m] and that is reset in response to a rise of the read start signal RDS[m].

The partial circuit 30[1] receives inputs of the input data DTi from the channels CH[1], CH[2], . . . , which belong to the group GR[1] in the input-side DMA controller DMAC2i, and the dummy data DTd. As data to the MAC circuits 25[1], 25[2], . . . , which belong to the group GR[1], the partial circuit 30[1] selects the input data DTi in a period in which the normal data selection signal ISL[1] of the group GR[1] is set, and selects the dummy data DTd in a period in which the dummy data selection signal DSL[1] of the group GR[1] is set. In a case in which the dummy data DTd is selected, the MAC circuits 25[1], 25[2], . . . , which belong to the group GR[1] perform the dummy calculation.

Similarly, the partial circuit 30[m] receives inputs of the input data DTi from the channels CH[n], CH[n−1], . . . , which belong to the group GR[m] in the input-side DMA controller DMAC2i, and the dummy data DTd. As data to the MAC circuits 25[n], 25[n−1], . . . , which belong to the group GR[m], the partial circuit 30[m] selects the input data DTi in a period in which the normal data selection signal ISL[m] of the group GR[m] is set and selects the dummy data DTd in a period in which the dummy data selection signal DSL[m] of the group GR[m] is set. In a case in which the dummy data DTd is selected, the MAC circuits 25[n], 25[n−1], . . . , which belong to the group GR[m] perform the dummy calculation.

In this manner, the dummy circuit 22 causes the MAC circuits 25 for each of the m number of groups GR[1] to GR[m] to perform the dummy calculation, according to the write end signals WTE[1] to WTE[m] and the read start signals RDS[1] to RDS[m] for the m number of groups GR[1] to GR[m], respectively. The grouping circuit 32 determines a correspondence relation between the n number of channels CH[1] to CH[n] and the read start signals RDS[1] to RDS[m], and between the n number of channels CH[1] to CH[n] and the write end signals WTE[1] to WTE[m], according to the setting made by the control signal CS2i from the sequence controller 21b.

Operation of Neural Network Engine (Second Embodiment

Figure 7:
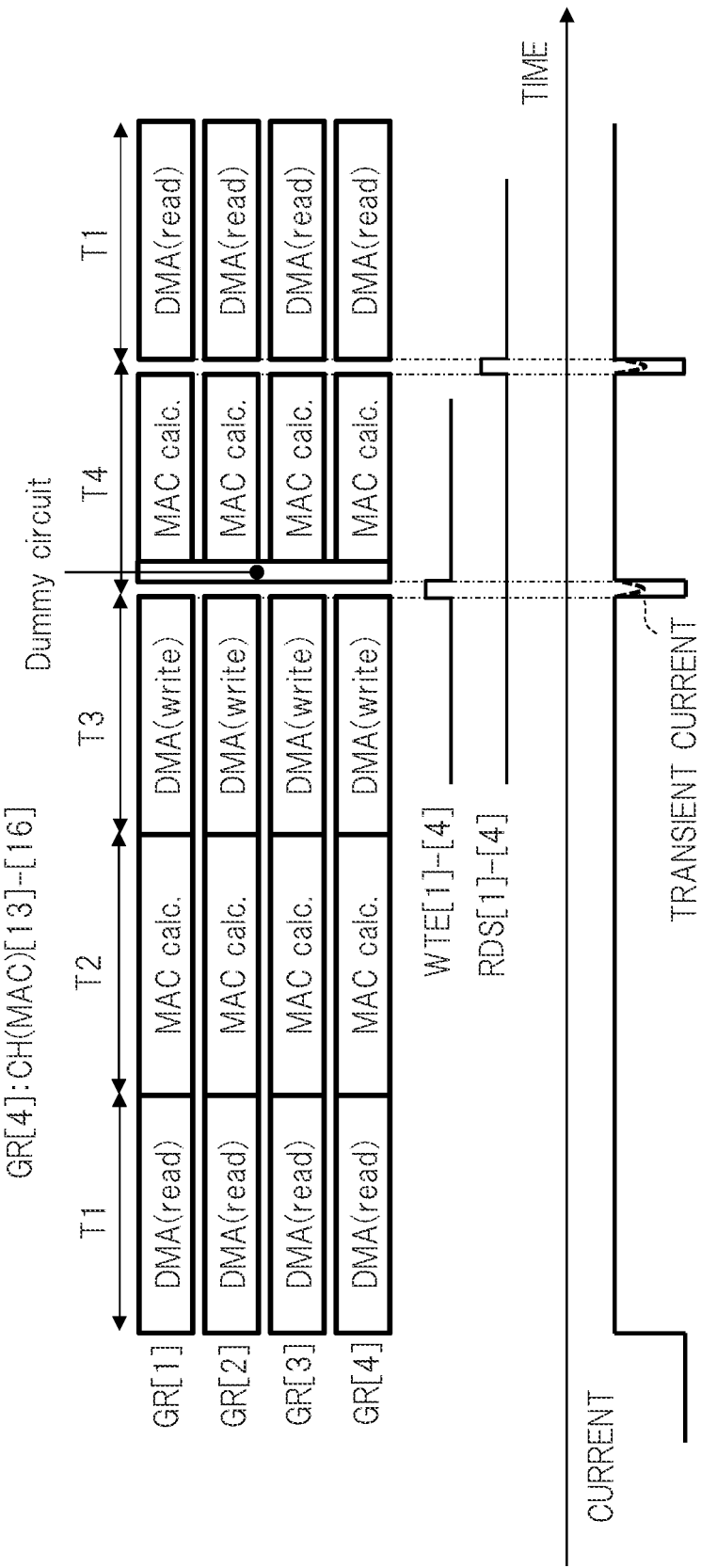
FIG. 7 is a timing chart showing an operational example of the neural network engine shown in FIG. 5.

FIG. 7 is a timing chart showing an operational example of the neural network engine showing in FIG. 5. In the operational example shown in FIG. 7, the start timings of the active periods (periods T1 to T3) in the m (m=4, in this example) number of groups GR[1] to GR[4] are identical to one another, and so are the end timings of the active periods.

In this case, the write end signals WTE[1] to WTE[4] in the groups GR[1] to GR[4], respectively, are simultaneously output at the end timing in the active period, that is, at the end timing in the period T3.

The dummy circuit 22 simultaneously starts the output of the dummy data DTd to each of the n number of MAC circuits 25[1] to 25[n], in response to the write end signals WTE[1] to WTE[4]. In response to this output, the n number of MAC circuits 25[1] to 25[n] simultaneously start the dummy calculations in the period T4. Subsequently, the dummy circuit 22 simultaneously receives inputs of the read start signals RDS[1] to RDS[4] in the groups GR[1] to GR[4].

The dummy circuit 22 stops the output of the dummy data DTd to each of the n number of MAC circuits 25[1] to 25[n], in response to the read start signals RDS[1] to RDS[4], and accordingly, causes the n number of MAC circuits 25[1] to 25[n] to end the dummy calculations. Then, the dummy circuit 22 simultaneously starts output of the normal input data DTi from the input-side DMA controller DMAC2i to each of the n number of MAC circuits 25[1] to 25[n] in the period T1, instead of the output of the dummy data DTd.

Thus, as shown in FIG. 7, causing the n number of MAC circuits 25[1] to 25[n] to perform the dummy calculations allows for prevention of a sharp variation in the current consumption. In other words, it is possible to reduce the current consumption, more specifically, the change rate of the transient current. Note that, for convenience of description, grouping described in the first embodiment is carried out here. However, in a case in which the operational example described in FIG. 7 is used, grouping is not necessarily required.

Figure 8:
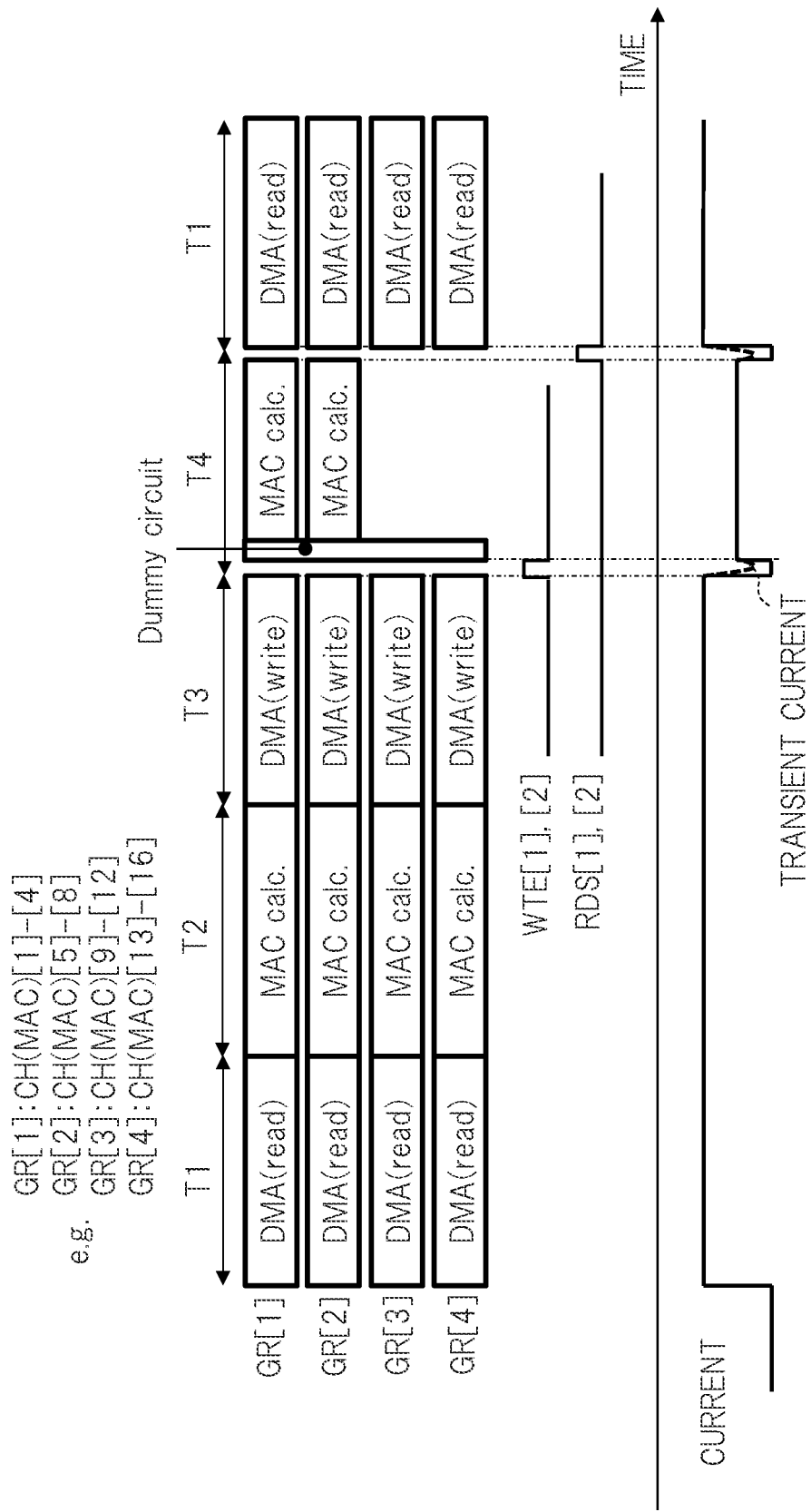
FIG. 8 is a timing chart showing an operational example different from that in FIG. 7.

FIG. 8 is a timing chart showing an operational example different from that in FIG. 7. With use of the operational example in FIG. 7, the change rate of the current consumption can be reduced. However, in contrast, the dummy calculation may cause an increase of unnecessary current consumption. In view of this, the operational example shown in FIG. 8 may be used. In the operational example in FIG. 8, unlike the operational example in FIG. 7, in the period T4, not all the groups GR[1] to GR[4], but some of the groups, that is, the MAC circuits 25 which belong to two groups GR[1] and GR[2] perform the dummy calculation.

Some of the groups described above can be changed according to a setting made by the control signal CS2d. More specifically, it is possible to set which group the MAC circuit 25 belongs to is caused to perform the dummy calculation. This setting of the group to be caused to perform the dummy calculation is made by the command CMD before a start of a process for a predetermined layer in the neural network, for example, as in the setting of the grouping, and the setting is maintained while carrying out the process for the predetermined layer.

In this manner, not all but one or more of the MAC circuits 25 are caused to perform the dummy calculation, resulting in prevention of an increase of unnecessary current consumption as well as prevention of a sharp variation in the current consumption. In other words, it is possible to reduce the change rate of the current consumption. Note that preventing an increase of unnecessary current consumption and reduction of the change rate of the current consumption become a trade-off relation. More specifically, as the number of MAC circuits 25 which is caused to perform the dummy calculation increases, the change rate of the current consumption can be made smaller. Conversely, however, unnecessary current consumption increases.

Main Effects of Second Embodiment

In the foregoing description, in the scheme of the second embodiment, the dummy circuit 22 is provided, and at least one or more of the n number of MAC circuits 25[1] to 25[n] are caused to perform the dummy calculation, so that a sharp variation in current consumption can be prevented. As a result, as in the case of the first embodiment, a variation in power supply voltage can be prevented, and designing of the power supply of the semiconductor device 10 can be facilitated. Moreover, it is possible to prevent an increase of design costs and manufacturing costs. In addition, it is possible to prevent an increase of unnecessary current consumption by causing not all but one or more of the MAC circuits 25 to perform the dummy calculation.

Third Embodiment

Operation of Neural Network Engine (Third Embodiment)

Figure 9:
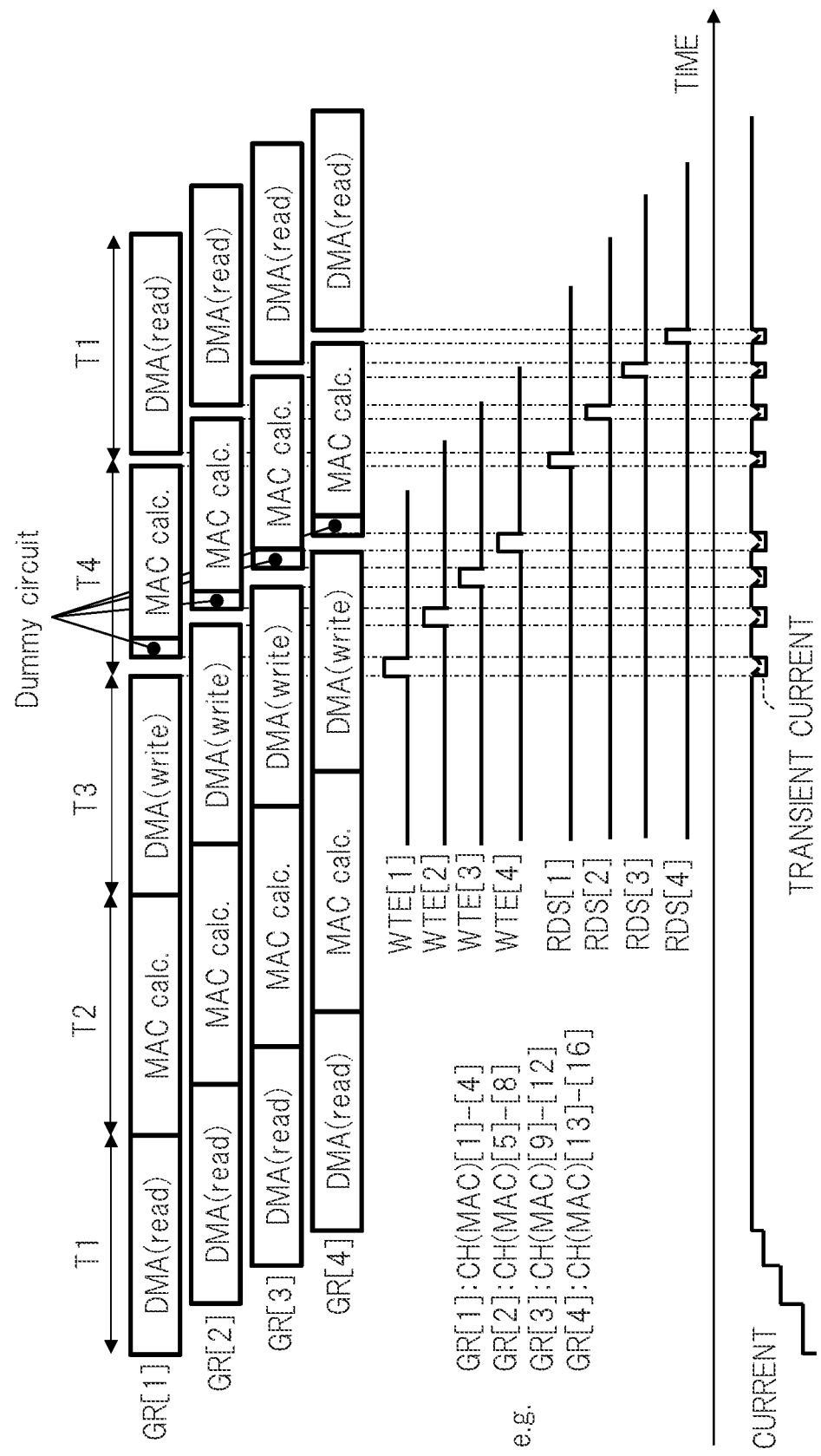
FIG. 9 is a timing chart showing an operational example of the neural network engine shown in FIG. 5, in a semiconductor device according to a third embodiment of the present disclosure.

FIG. 9 is a timing chart showing an operational example of the neural network engine shown in FIG. 5, in a semiconductor device according to a third embodiment of the present disclosure. The operational example shown in FIG. 9 is an operation such that the operation shown in FIG. 3 and the operation shown in FIG. 7 are combined. Specifically, in FIG. 9, as in the operation in FIG. 3, start timings and end timings in a series of the active periods including the periods T1 to T3 are controlled so as to be different from one another among the four groups GR[1] to GR[4]. In addition to this, in FIG. 9, in the period T4, as in the case of FIG. 7, the dummy calculation is carried out.

Figure 10:
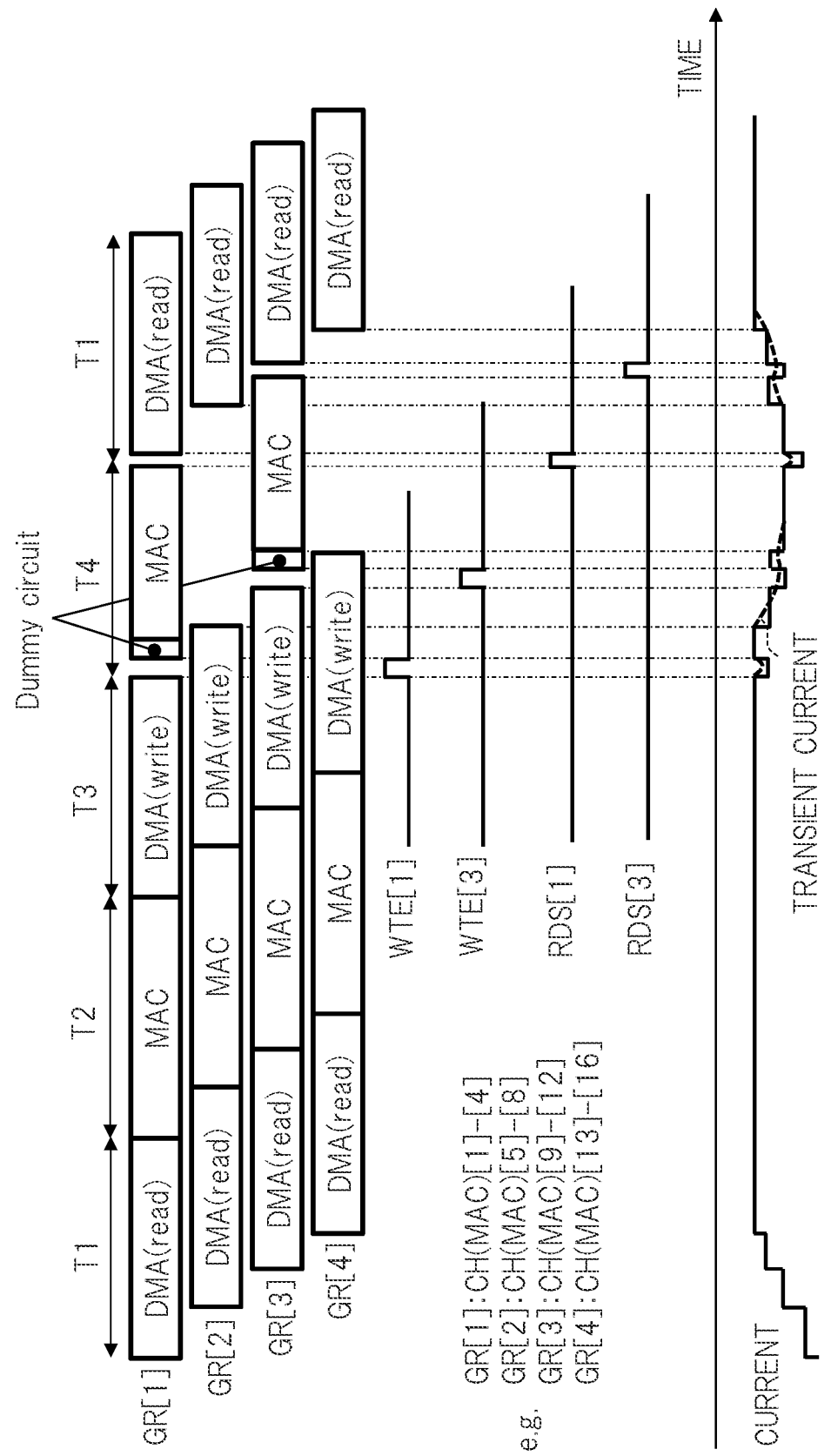
FIG. 10 is a timing chart showing an operational example different from that in FIG. 9.

FIG. 10 is a timing chart showing an operational example different from that in FIG. 9. The operational example shown in FIG. 10 is one in which the similar scheme to the case of FIG. 8 is applied to the operational example in FIG. 9. Specifically, in FIG. 10, in the period T4, not all but one or more of the MAC circuits, in this example, the MAC circuits 25[1] and 25[3] which belong to the groups GR[1] and GR[3], respectively, perform the dummy calculations.

With use of the operational example shown in FIG. 9, for example, in comparison to the cases in FIG. 3 and FIG. 7, the change rate of the current consumption in association with switching between the active periods (periods T1 to T3) and the idle period (period T4) in each of the groups GR[1] to GR[4] can be made much smaller. In addition, with use of the operational example shown in FIG. 10, by application of the similar scheme to the case of FIG. 9, the change rate of the current consumption can be made smaller, and an increase of the unnecessary current consumption can be prevented as a result of application of the similar scheme to the case of FIG. 8.

Fourth Embodiment

Setting of Group and Dummy Circuit

Figure 11:
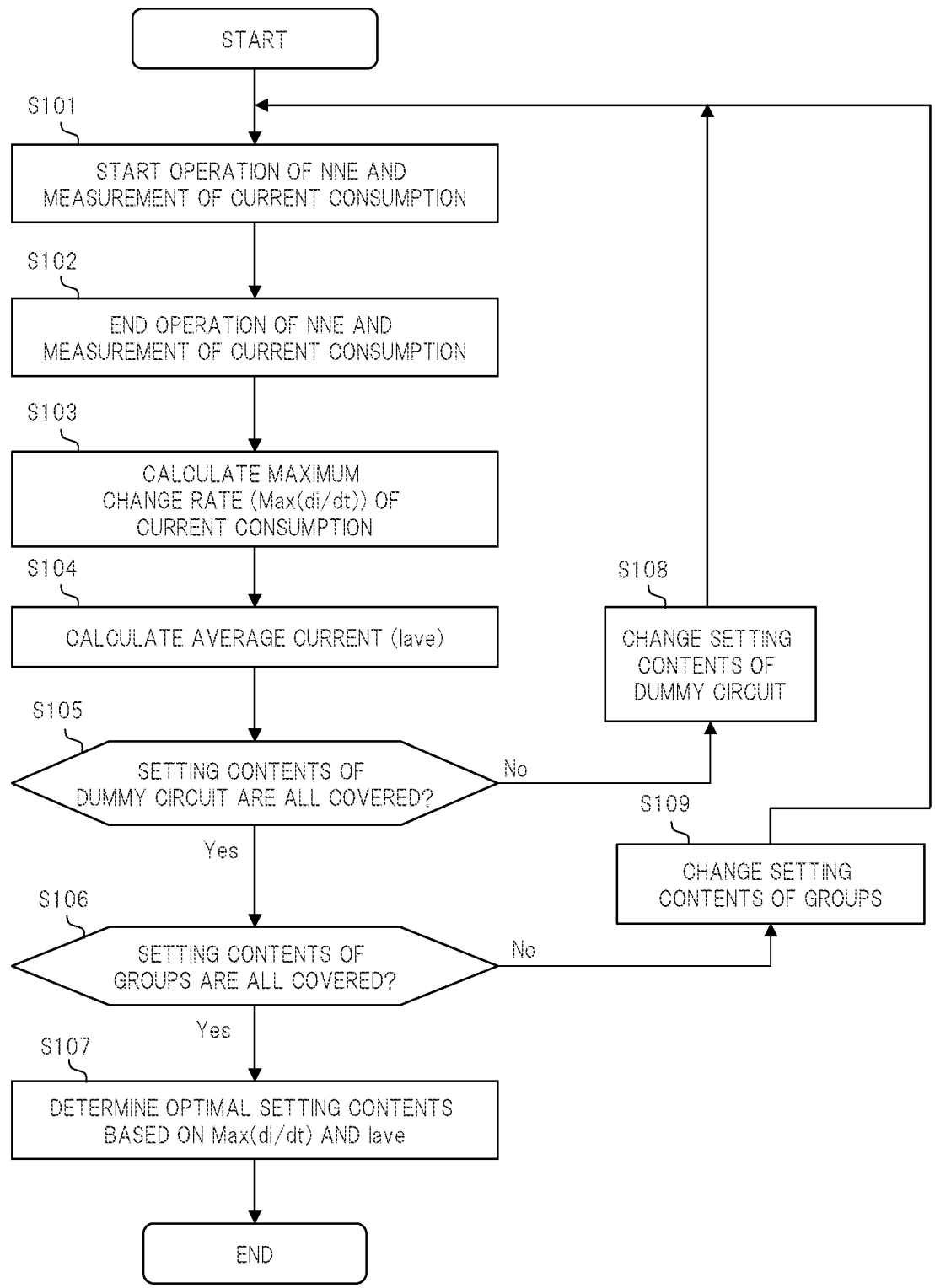
FIG. 11 is a flow chart indicating one example of a method of determining setting contents of a group and setting contents of dummy circuits, in a semiconductor device according to a fourth embodiment of the present disclosure.

FIG. 11 is a flow chart indicating one example of a method of determining setting contents of groups and setting contents of the dummy circuit, in a semiconductor device according to a fourth embodiment of the present disclosure. For example, in a case in which the operational example shown in FIG. 10 is used, an extent of an effect A of reducing the change rate of the current consumption and an extent of an effect B of preventing an increase of the unnecessary current consumption change according to setting contents of groups, that is, the number of groups, setting contents of the dummy circuit 22, that is, the number of groups that is caused to perform the dummy calculation, and a combination thereof.

The effects A and B become trade-off relations, as described in FIG. 8. Accordingly, it is desirable that optimal setting contents are determined by a certain method. As a method of determining the optimal setting contents, for example, a method of using a simulation can be considered. However, the optimal setting contents may be changed, depending on a configuration of a neural network to be processed, that is, how the neural network engine (NNE) is operated. In addition, an error generated between a result of the simulation and an actual measurement may also be generated. In view of this, here, with use of a flow indicated in FIG. 11, the optical setting contents are determined.

The flow indicated in FIG. 11 is carried out by a processor 17, for example, in FIG. 4, on the basis of a calibration program or the like stored in the memory MEM1. In FIG. 11, the processor 17 starts an operation of the neural network engine (NNE) 15b and a measurement of the current consumption (step S101).

More specifically, the processor 17 causes the neural network engine (NNE) 15b to perform a process for a certain object layer in the neural network, for example. More specifically, the processor 17 causes the sequence controller 21b of the neural network engine 15b to sequentially read a series of commands CMD and the like, the commands CMD representing an operation sequence of the object layer and being stored in the memory MEM1. In addition, the processor 17 uses a current sensor that is installed in the wires of the power supply of the semiconductor device 10, for example, to measure the current consumption.

Subsequently, the processor 17 ends the operation of the neural network engine 15b and the measurement of the current consumption (step S102). Here, an operation period of the neural network engine 15b, that is, the process for the object layer to be carried out in the period of the steps S101 to S102 may be a process performed on a coordinate region of a small part of the object layer. More specifically, in the operation period, with the periods T1 to T4 shown in FIG. 10 as one cycle, for example, it is only sufficient if a process of substantially several cycles is carried out.

After the step S102, the processor 17 calculates a maximum change rate (Max(di/dt)) of the current consumption and an average current (Iave), on the basis of the current consumption measured in the operation period of the neural network engine 15b (steps S103 and S104). Next, the processor 17 determines whether or not the setting contents of the dummy circuit 22, that is, the number of groups which is caused to perform the dummy calculation and a combination thereof is all covered (step S105).

In a case in which the setting contents of the dummy circuit 22 are not all covered (step S105: No), the processor 17 changes the setting contents of the dummy circuit 22 and returns to step S101 (step S108). Conversely, in a case in which the setting contents of the dummy circuit 22 are all covered (step S105: Yes), the processor 17 determines whether or not the setting contents of the groups, that is, the number of groups that can be set is all covered (step S106). In a case in which the setting contents of the groups are not all covered (step S106: No), the processor 17 changes the setting contents of the groups and returns to step S101 (step S109).

In steps S108 and S109, the processor 17 outputs the command CMD representing each setting content after being changed, for example, to the sequence controller 21b of the neural network engine 15b, thereby changing the setting contents of the dummy circuit 22 and the setting contents of the groups. For the setting contents of the groups, that is, the number of groups that can be set, a plurality of options are determined in advance, and any one of the options is selected according to the command CMD. In addition, the option of the setting contents of the dummy circuit 22 is determined according to the setting contents of the groups, that is, the number of selected groups.

In a case in which the setting contents of the groups are all covered (step S106: Yes), the processor 17 determines the optimal setting contents on the basis of the maximum change rate of the current consumption and the average current (Iave) which are calculated for each of different setting contents in the steps S103 and S104 (step S107). Here, in the optimal setting contents, the maximum change rate of the current consumption and the average current which become a trade-off relation decrease together. Accordingly, for example, it is only sufficient if the processor 17 sets such setting contents that a value obtained by adding up the maximum change rate and the average current which have been weighted becomes the minimum value as the optimal setting contents.

The optimal setting contents are, for example, determined by each layer of the neural network. For example, in a calibration process before a start of the actual neural network processing, by use of a flow indicated in FIG. 11, the optimal setting contents for each layer are determined. In the actual neural network processing carried out after this calibration process, the optimal setting contents determined in the calibration process are applied. More specifically, it is sufficient if the processor 17 causes the optimal setting contents determined for each layer to be stored in the memory MEM1 or the like, as the command CMD associated with each layer, for example, and to be read by the sequence controller 21b at a time of the start of the actual process for each layer.

Main Effects of Fourth Embodiment

As described above, with use of the scheme of fourth embodiment, in addition to various types of effects described in the first to third embodiments, optimization of the setting contents of the groups and the dummy circuit 22 can be achieved. That is, a sharp variation in the current consumption and an increase of the unnecessary current consumption can be prevented in a well-balanced manner.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. A semiconductor device that executes neural network processing, comprising:
   n (n is an integer that is two or more) number of multiplier accumulators configured to multiply and accumulate pieces of input data and parameters;
   one or a plurality of memories configured to store the pieces of input data and the parameters;
   a first DMA (Direct Memory Access) controller configured to transfer the parameters stored in the memory to the n number of multiplier accumulators;

a second input-side DMA controller configured to transfer the pieces of input data stored in the memory to the n number of multiplier accumulators, by use of n number of channels, respectively, and cause the n number of multiplier accumulators to perform calculations and to thereby output corresponding pieces of normal output data serving as the calculation results;

a dummy circuit configured to output dummy data determined in advance to at least one or more of the n number of multiplier accumulators, thereby causing the at least one or more of the n number of multiplier accumulators to perform a dummy calculation and to output dummy output data serving as the dummy calculation result; and a second output-side DMA controller configured to transfer the respective pieces of normal output data from the n number of multiplier accumulators to the memory, by use of n number of channels, and not to transfer the dummy output data from the at least one or more of the n number of multiplier accumulators to the memory, wherein the at least one or more of the n number of multiplier accumulators perform the dummy calculation in a period from a timing at which the second output-side DMA controller ends data transfer to the memory to a timing at which the second input-side DMA controller starts data transfer from the memory.

2. The semiconductor device according to claim 1, further comprising:

a sequence controller configured to output a read start signal for starting the data transfer from the memory to the second input-side DMA controller, wherein the second output-side DMA controller outputs a write end signal when ending the data transfer to the memory, and wherein the dummy circuit outputs the dummy data to the at least one or more of multiplier accumulators in response to the write end signal from the second output-side DMA controller, and outputs the respective pieces of input data from the second input-side DMA controller to the n number of multiplier accumulators in response to the read start signal from the sequence controller.

3. The semiconductor device according to claim 2, the sequence controller further divides the n number of channels of each of the second input-side DMA controller and the second output-side DMA controller and the n number of multiplier accumulators into m (m is an integer smaller than n) number of groups, and outputs, to the second input-side DMA controller, the read start signal for each of the m number of groups at different timings from one another, thereby controlling such that a series of operation timings including a read operation by the second input-side DMA controller, a calculation operation by the multiplier accumulator, and a write operation by the second output-side DMA controller is different from one another among the m number of groups, wherein the second output-side DMA controller outputs the write end signal to each of the m number of groups, and wherein the dummy circuit causes the multiplier accumulator of each of the m number of groups to perform the dummy calculation, according to the write end signal for each of the m number of groups and the read start signal for each of the m number of groups.

4. The semiconductor device according to claim 3, wherein the dummy circuit causes part of the m number of groups to perform the dummy calculation.

5. The semiconductor device according to claim 4, wherein the part of the m number of groups is allowed to be changed by setting.

6. The semiconductor device according to claim 3, wherein the m number of groups are allowed to be changed by setting.

7. A semiconductor device that executes neural network processing, comprising:

n (n is an integer that is two or more) number of multiplier accumulators configured to multiply and accumulate pieces of input data and parameters;

one or a plurality of memories configured to store the pieces of input data and the parameters;

a first DMA (Direct Memory Access) controller configured to transfer the parameters stored in the memory to the n number of multiplier accumulators;

a second input-side DMA controller configured to transfer the pieces of input data stored in the memory to the n number of multiplier accumulators, by use of n number of channels, respectively, and cause the n number of multiplier accumulators to perform calculations and to thereby output corresponding pieces of normal output data serving as the calculation results;

a dummy circuit configured to output dummy data determined in advance to at least one or more of the n number of multiplier accumulators, thereby causing the at least one or more of the n number of multiplier accumulators to perform a dummy calculation and to output dummy output data serving as the dummy calculation result;

a second output-side DMA controller configured to transfer the respective pieces of normal output data from the n number of multiplier accumulators to the memory, by use of n number of channels, and not to transfer the dummy output data from the at least one or more of the n number of multiplier accumulators to the memory; and a sequence controller configured to output a read start signal for starting the data transfer from the memory to the second input-side DMA controller, wherein the sequence controller divides the n number of channels of each of the second input-side DMA controller and the second output-side DMA controller and the n number of multiplier accumulators into m (m is an integer smaller than n) number of groups, and outputs, to the second input-side DMA controller, the read start signal for each of the m number of groups at different timings from one another, thereby controlling such that a series of operation timings including a read operation by the second input-side DMA controller, a calculation operation by the multiplier accumulator, and a write operation by the second output-side DMA controller is different from one another among the m number of groups.

8. The semiconductor device according to claim 7, wherein the m number of groups are allowed to be changed by setting.

9. A semiconductor device including one semiconductor chip, comprising:

a neural network engine configured to execute neural network processing;

one or a plurality of memories configured to store pieces of input data and parameters;

a processor; and a bus configured to connect the neural network engine, the memories, and the processor with each other, wherein the neural network engine includes:

n (n is an integer that is two or more) number of multiplier accumulators configured to multiply and accumulate pieces of input data and parameters;

one or a plurality of memories configured to store the pieces of input data and the parameters;

a first DMA (Direct Memory Access) controller configured to transfer the parameters stored in the memory to the n number of multiplier accumulators;

a second input-side DMA controller configured to transfer the pieces of input data stored in the memory to the n number of multiplier accumulators, by use of n number of channels, respectively, and cause the n number of multiplier accumulators to perform calculations and to thereby output corresponding pieces of normal output data serving as the calculation results;

a dummy circuit configured to output dummy data determined in advance to at least one or more of the n number of multiplier accumulators, thereby causing the at least one or more of the n number of multiplier accumulators to perform a dummy calculation and to output dummy output data serving as the dummy calculation result; and a second output-side DMA controller configured to transfer the respective pieces of normal output data from the n number of multiplier accumulators to the memory, by use of n number of channels, and not to transfer the dummy output data from the at least one or more of the n number of multiplier accumulators to the memory, wherein the at least one or more of the n number of multiplier accumulators perform the dummy calculation in a period from a timing at which the second output-side DMA controller ends data transfer to the memory to a timing at which the second input-side DMA controller starts data transfer from the memory.

10. The semiconductor device according to claim 9, wherein the neural network engine further includes a sequence controller configured to output a read start signal for starting the data transfer from the memory to the second input-side DMA controller, wherein the second output-side DMA controller outputs a write end signal when ending the data transfer to the memory, and wherein the dummy circuit outputs the dummy data to the at least one or more of multiplier accumulators in response to the write end signal from the second output-side DMA controller, and outputs the respective pieces of input data from the second input-side DMA controller to the n number of multiplier accumulators in response to the read start signal from the sequence controller.

11. The semiconductor device according to claim 10, the sequence controller further divides the n number of channels of each of the second input-side DMA controller and the second output-side DMA controller and the n number of multiplier accumulators into m (m is an integer smaller than n) number of groups, and outputs, to the second input-side DMA controller, the read start signal for each of the m number of groups at different timings from one another, thereby controlling such that a series of operation timings including a read operation by the second input-side DMA controller, a calculation operation by the multiplier accumulator, and a write operation by the second output-side DMA controller is different from one another among the m number of groups, wherein the second output-side DMA controller outputs the write end signal to each of the m number of groups, and wherein the dummy circuit causes the multiplier accumulator of each of the m number of groups to perform the dummy calculation, according to the write end signal for each of the m number of groups and the read start signal for each of the m number of groups.

12. The semiconductor device according to claim 11, wherein the dummy circuit causes part of the m number of groups to perform the dummy calculation.

\* \* \* \* \*